Aug. 29, 1939.  D. G. CAMPBELL  2,171,264
ICE CUBING MACHINE
Filed April 30, 1937   3 Sheets-Sheet 2

INVENTOR
Donald G. Campbell.
BY
ATTORNEYS

Aug. 29, 1939.  D. G. CAMPBELL  2,171,264
ICE CUBING MACHINE
Filed April 30, 1937  3 Sheets-Sheet 3
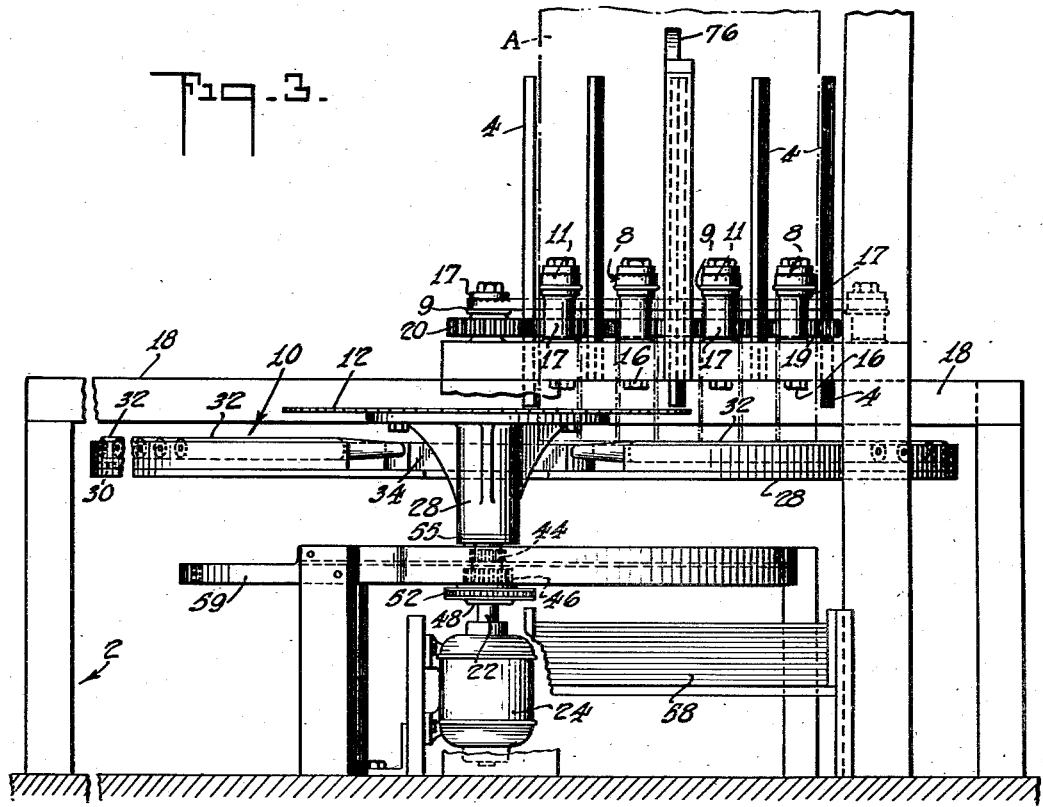
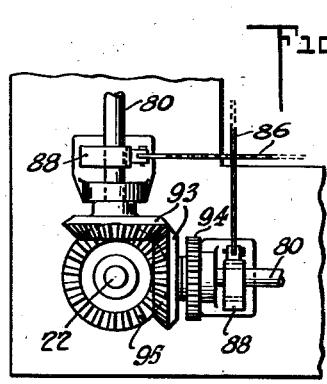
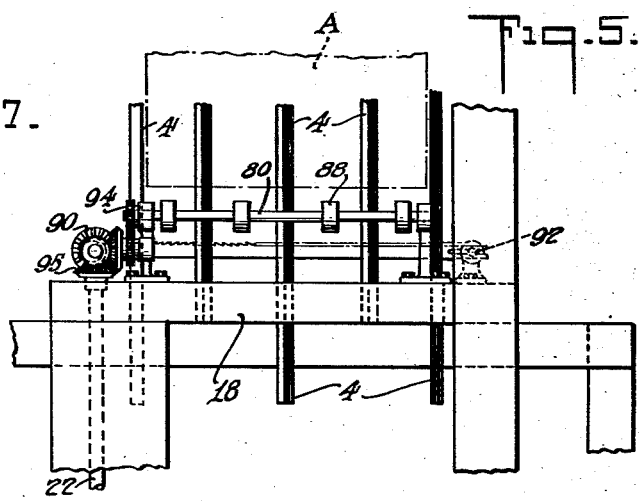
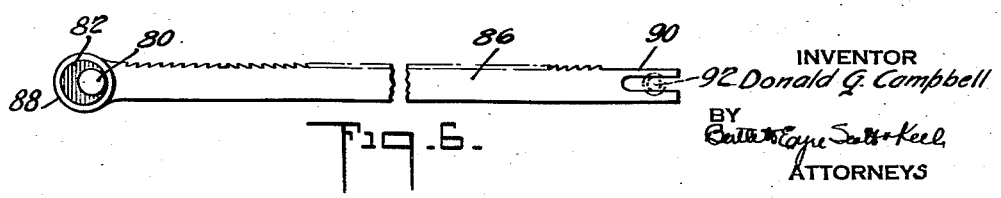
INVENTOR
Donald G. Campbell
BY
ATTORNEYS Patented Aug. 29, 1939

2,171,264

UNITED STATES PATENT OFFICE 2,171,264

ICE CUBING MACHINE

Donald G. Campbell, New York, N. Y.

Application April 30, 1937, Serial No. 139,959

3 Claims. (Cl. 143—33)

The invention herein relates to a machine for subdividing material into pieces of desired shape and is particularly applicable to the cutting of bulk material wherein a plurality of cuts are required to produce smaller pieces of a given size.

An object of the present invention is a machine wherein the cutting devices are so alined that the material to be cut need not be shifted from one position to another. A further object is a device wherein all operations may be performed from a single power source. A still further object is a device wherein any or all of a combination of cuts in different planes may be readily accomplished. A still further object is a device wherein the size of cuts may be varied. These and other objects will be readily understood from the following description with reference to the accompanying drawings wherein:

Fig. 3 is a partial front elevation of Fig. 1;

Figs. 5, 6 and 7 show an alternative cutting device; and

Figs. 8 and 9 show another alternative cutting device.

Figure 1:
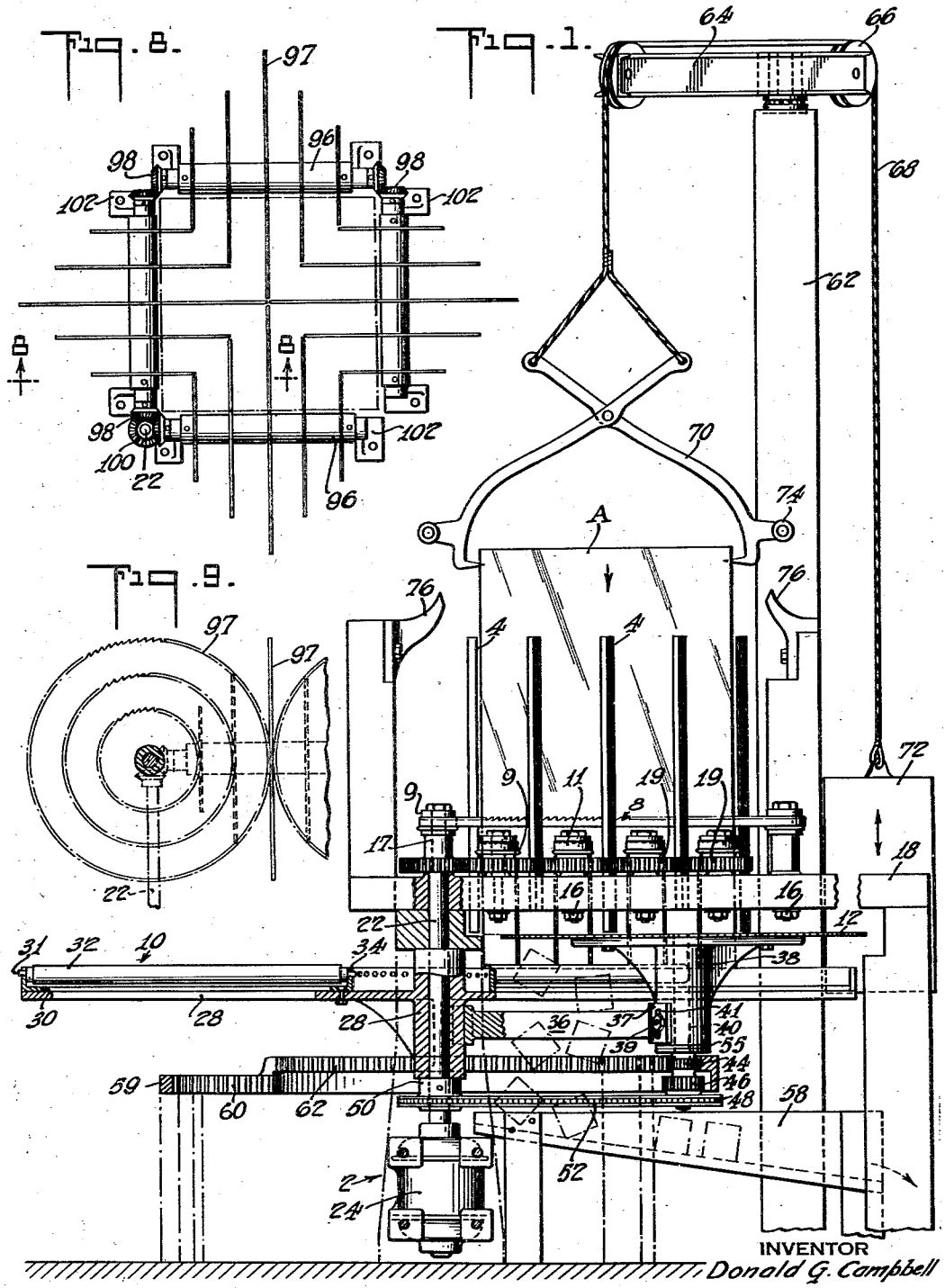
Fig. 1 is a side elevation partly in section of one embodiment.
Figure 2:
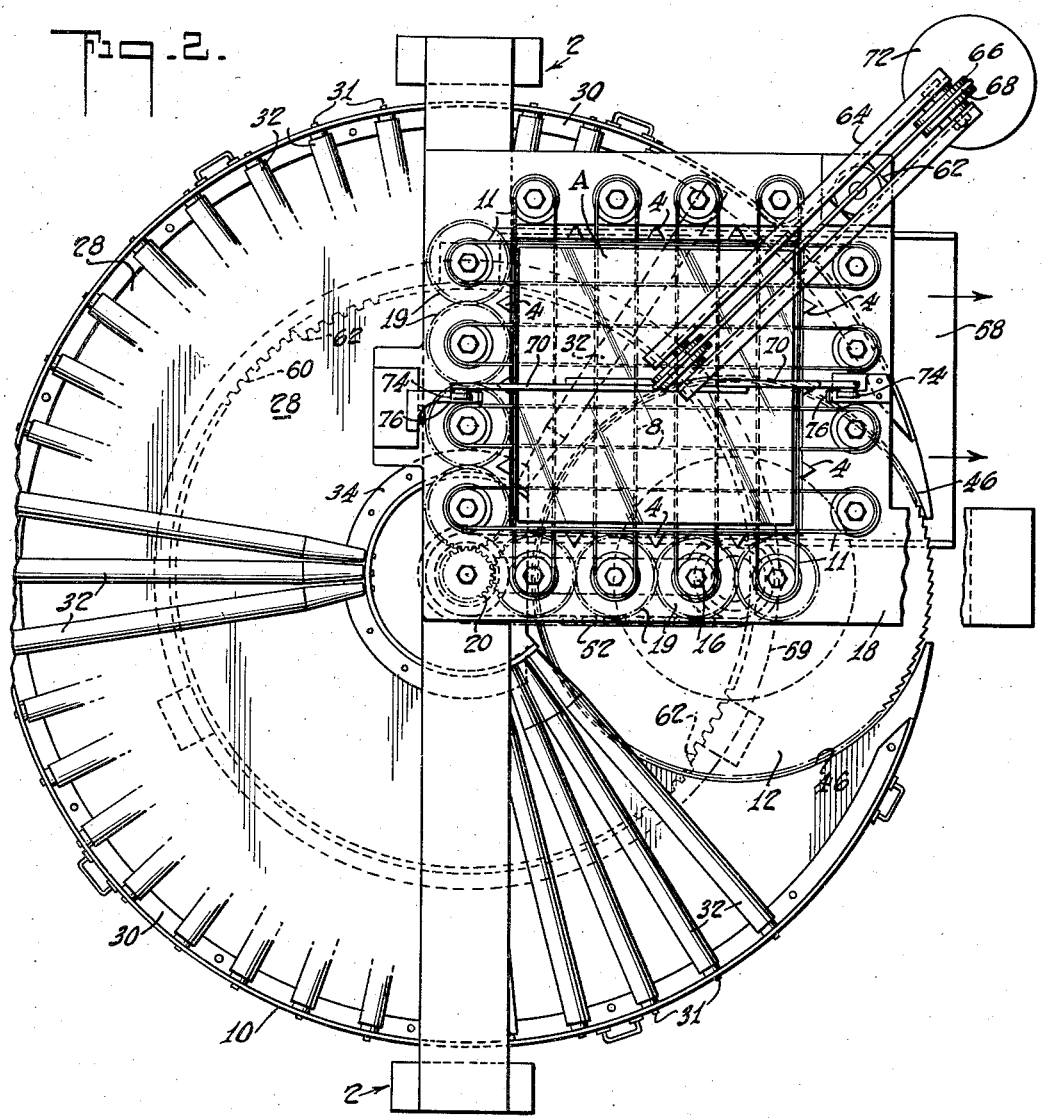
Fig. 2 is a plan view of Fig. 1.
Figure 4:
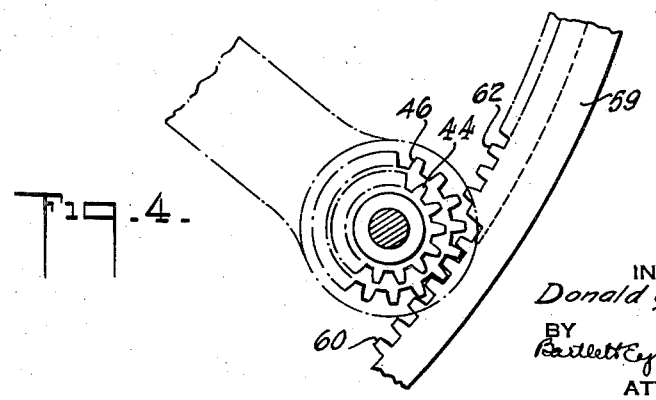
Fig. 4 is a detail of the drive mechanism.

Referring to the drawings, the machine in general comprises a supporting structure 2, a plurality of members 4 forming a guideway for positioning the material or object to be cut, and holding it in a fixed position, a plurality of cutting devices 8 arranged to traverse the guideway and produce vertical cuts, a revolving receiving table 10 adapted to receive and limit the movement of the material after passing or partially passing through the cutting devices 8, and a rotating saw 12 intermediate of the cutting devices 8 and receiving table 10 for producing a horizontal cut in the material, the saw 12 being eccentrically mounted relative to the receiving table 10 and revolving therewith and simultaneously but independently rotatable about its own axis, the table being provided with an opening beneath saw 12 to permit the cut material to drop therethrough. For simplicity in drawings only one set of vertical cutting saws and one horizontal saw have been shown, it being apparent that due to the circular nature of the table 10 a plurality of such cutting devices could be used.

The supporting structure 2 includes the rectangular frame 18 which carries the uprights 4, these uprights forming a guideway for material to be cut such as the cake of ice A, the uprights 4 being frictionally held in grooves in frame 18 so that they may be spaced properly relative to saw 12. Removably mounted on frame 18 are spindles or shafts 16 on which saw arbors 17 are rotatably mounted. The saw arbors are provided with guides 9 in which band saws 11 are mounted, these being two sets of saws arranged at right angles to one another the saws traversing the guideway and producing vertical cuts in the material A. The saw arbors 17 are provided with gears 19 which intermesh to form a driving connection with a driven gear 20 which is splined on power shaft 22. The power shaft 22 centrally located relative to the machine is driven by any suitable means such as a motor 24.

Concentrically mounted on the power shaft 22 beneath the frame 18 is a receiving table 10 comprising a webbed member 28 having secured thereon an inner ring 34 and peripheral ring 30 between which are suspended radial rods 31 on which are rotatably mounted rollers 32. The carrier member 28 is also provided with a radial arm 36 terminating in a bracket 37 on which is carried a supporting member 38 in which shaft 40 of the horizontal saw 12 is journaled. Member 38 is secured by bolt 39 to bracket 37, the bracket having an elongated slot 41 to permit vertical adjustment of member 38, relative to table 10. Splined on the lower end of shaft 40 are gears 44, 46 and 48, the gear 48 being interconnected through a chain belt 52 with a gear 50 on power shaft 22. Suitable spacing members 55 may be interposed between gear 44 and member 38 for vertical adjustment purposes. There is also provided a rack 59 having a double track 60 and 62, the gear 44 meshing with the track 62 and the gear 46 meshing with track 60, with the gears successively engaging the rack to simultaneously revolve receiving table 10 and saw 12 about the axis of power shaft 22 at different speeds. The receiving table 10 is cut away at 56 to approximately the size of the saw 12 to form an opening through which the cut material may drop into a chute 58 from which it may be removed, the chute being padded with rubber or the like if fragile material is being cut.

For the handling of heavy bulk material there is provided an upright 62 having a swiveled crosshead 64 carrying suitable pulleys 66 over which a hoisting line 68 is passed, one end of the hoisting line carrying a pair of tongs 70 and the other a counter-balance 72. The tongs 70 are provided with a pair of ear portions 74 which are adapted to contact the trip hooks 76 as the material is lowered during the cutting operation whereupon the ears 74 will release the tongs 70 from the material A.

In operation the motor 24 drives power shaft 22 and gear 20, which, meshing with the gears 19 on arbors 17, cause rotation of the band saws 11. As the saws 11 produce their vertical cuts the ice will be lowered onto the rollers 32 of the receiving table 10. Simultaneously gear 48 through chain 52 causes rotation of the drive shaft 40 and saw 12 and through either gear 44 or gear 46 meshing with the rack 59, simultaneously revolves receiving table 10 and saw 12 about power shaft 22 and independently rotate saw 12 about its own shaft 40 and independently rotates saw 12 about its own shaft 40. As the guides 4 will position and prevent the material from being moved, table 10 will move under same until saw 12 is brought into contact with the material. In order that the saw will not be driven through the ice at too great a rate of speed gear 44 is brought into mesh with track 62 at this point and at the same time gear 46 is taken out of mesh with track 60, whereby the speed of the revolution of saw 12 about the power shaft 22 will be reduced to permit saw 12 to move slowly through the material. After saw 12 has passed completely through the bulk material A will again descend onto the rollers 32 and gear 46 having again meshed with track 60 and gear 44 having gone out of mesh with track 62, the saw will again be carried rapidly around into cutting position. From the foregoing, it will be seen that as the material is placed onto the saws 12 it will be cut transversely at 90° to one another to form vertical columns and upon descending onto the table 10 the saw 12 will cut the vertical columns horizontally into small cubes. In handling heavy material, the material may be lifted by the tongs 70 and the counterbalance 72 on the end of line 68 be attached, the weight of the counterbalance being less than that of the bulk material so that the initial weight resting on the saws will not be too great but still great enough to cause the object to feed through the machine. As the material is cut down to approximately the weight of the counterbalance 72 the tongs will be tripped to release same. The tongs 70, upright 62 and counterbalance 72 may be eliminated and if desired the entire machine may be built with the shaft 22 on an angle to the vertical whereby the material may be fed into the guideway formed by the members 4 which will support the weight of the same and the receiving table 10 limit the movement thereof.

In Figs. 5, 6 and 7 the band saws and arbors are replaced by a set of drive shafts 80 on which are mounted eccentric cams 82 to drive blades 86, the blades formed at one end with an eccentric strap 88 and at the other a tongue 90 which permits the blade to reciprocate freely on a supporting shaft 92. The ends of the drive shafts 80 are provided with gears 93 and 94 adapted to mesh with a beveled gear 95 which may replace the gear 20 on the main drive shaft 22. In the embodiment shown in Figs. 8 and 9 there are provided circular saws 97 mounted on arbors 96, the arbors being provided with suitable intermeshing gears 98 which are driven from a gear 100 carried by an extension of the main shaft 22. The arbors are supported on suitable bearings 102 which are raised a distance above frame 18 equal to the diameter of the largest saw.

From the foregoing it may be seen that the entire mechanism may be operated from a single power shaft. The size of the cuts may be varied due to the vertical adjustment of saw 12 and the ready replacement of the various traverse cutting units. By removing the traverse cutting means the machine may be used for horizontal cutting only.

With such modifications contemplated and the preferred embodiment shown the following is claimed:

1. A cutting machine of the class described comprising a frame, a plurality of members carried by said frame and forming a guideway for the object to be cut, saw arbors carried by said frame, saws carried by said arbors and traversing the guideway, a power shaft, gears connecting said shaft and arbors for operating the saws, a receiving table, a support for the table rotatably mounted on the power shaft, an arm extending from said support, a saw shaft supported by said arm at the outer end thereof, a rotatable saw carried by said saw shaft above the table, a plurality of gears splined on the lower end of the saw shaft, a driving connection between one of the gears and the power shaft for rotating the saw about its own axis, and a rack adapted to engage another of the gears whereby rotation of the shaft will simultaneously revolve the table and saw about another axis.

2. In a machine of the class described, a supporting frame, a plurality of guide members carried by said frame and defining a guideway, a plurality of saw carrying devices carried by said frame, a plurality of saws carried by said devices alined with the guideway, a centrally located power shaft, driving means for rotating said devices connecting to the power shaft, a circular receiving table beneath said frame, a journaled support on said shaft for carrying said table, a horizontal cutting saw intermediate of the table and the frame, an arm extending from the table for eccentrically carrying said saw relative to the table, a drive shaft for the saw, power means for rotating said saw shaft from the power shaft, reducing gears carried on said saw shaft, a rack meshing with said reducing gears for revolving the table, and power means for operating said power shaft.

3. A cutting machine of the class described, comprising a frame, a guideway carried by the frame, a plurality of saw-carrying devices supported on the frame, a plurality of saws carried by said devices and aligned with the guideway, a centrally located driven shaft, driving means for rotating said devices connecting to the driven shaft, a circular receiving table beneath said frame rotatably mounted on said driven shaft, a horizontal cutting saw intermediate of the table and the frame, an arm extending from the table for eccentrically carrying said saw relative to the table, a drive shaft for the saw, power means for rotating said saw shaft from the driven shaft, reducing gears carried on said saw shaft, and a rack meshing with said reducing gears for revolving the table, and power means for operating said driven shaft.

DONALD G. CAMPBELL.